United States Patent [19]

Mizioch

[11] Patent Number: 4,921,123

[45] Date of Patent: May 1, 1990

[54] DEBRIS CAP

[76] Inventor: Gregory J. Mizioch, 12801 N. 2nd St., Phoenix, Ariz. 85022

[21] Appl. No.: 335,296

[22] Filed: Apr. 10, 1989

[51] Int. Cl.⁵ .............................................. B65D 45/28
[52] U.S. Cl. ................................... 220/323; 220/238; 220/318; 138/89
[58] Field of Search ............... 220/234, 235, 237, 238, 220/287, 318, 323, 352; 217/78, 79, 108, 109; 215/359, 360; 138/89, 89.4

[56] References Cited

U.S. PATENT DOCUMENTS

| | | | |
|---|---|---|---|
| 1,045,287 | 11/1912 | Henderson | 220/234 X |
| 3,543,801 | 12/1970 | Thayer et al. | 138/89 |
| 3,820,682 | 6/1974 | Darella | 220/315 |
| 4,027,701 | 6/1977 | Duckworth, Jr. | 220/238 X |
| 4,384,656 | 5/1983 | McQuiston et al. | 220/323 |
| 4,387,740 | 6/1983 | Vanzant | 138/89 |
| 4,693,278 | 9/1987 | Wilson et al. | 138/89 |

Primary Examiner—Stephen Marcus
Assistant Examiner—Nova Stucker
Attorney, Agent, or Firm—Cahill, Sutton & Thomas

[57] ABSTRACT

A debris cap is provided for closing the end of an access pipe for an underground water shut-off valve. A hollow member with a closed end and a cylindrical outer surface has a plurality of resilient pads spaced around its periphery. At least one of the pads is carried on the outer end of a slide which is moveable radially of the hollow member by a rotatable cam carried at the closed end of the member. Rotation of the cam by a handle moves the slide and the pad carried thereon outwardly to cause the pads to grip the inner surface of the access pipe to hold the cap in place. The angle of advance on the cam is slight so that external force applied to the slide does not rotate the cam. The cap is also adapted to carry a locating coil.

4 Claims, 1 Drawing Sheet

DEBRIS CAP

TECHNICAL FIELD

This invention has to do with closing the upper end of an access pipe for an underground shut-off valve.

BACKGROUND ART

Municipal water supply systems usually bury their mains under public rights of way such as streets. At spaced intervals throughout the system normally open, shut-off valves are incorporated for the purpose of isolating main breaks so they can be repaired.

These shut-off valves are frequently buried several feet beneath the street and access pipes are provided which extend upwardly from the valve to near street level. The access pipe provides a passage for a tool which can be manipulated from street level to actuate the valve.

A cover with a removable lid is usually incorporated into the street pavement to prevent debris from filling the access pipe. Unfortunately, vehicle movement and vandalism often cause the lids of these covers to be displaced and even lost. This allows debris to enter the access pipe and prevent or delay access to the valve. Time is important in repairing water main breaks and the need to clean out an access pipe can significantly delay such repairs.

It therefore is desirable to close the upper end of the access pipe to exclude debris in the event the cover lid is displaced. There is a need for an inexpensive, reliable and easily installed debris cap for this purpose.

Access pipes must also be capped during construction and repair operations on the street. During such operations the water shut-off access pipe can be covered over with earth or pavement. Locating the covered access pipes is difficult and time consuming. There is the further need for means for quickly and easily locating access pipes which have been covered over.

DISCLOSURE OF THE INVENTION

This invention provides a debris cap which comprises a hollow member with a cylindrical outer surface and a closure over one end. Spaced around the outer surface of the hollow member are a plurality of elastic resilient pads capable of frictionally engaging the inner surface of the access pipe to hold the cap in place. At least one of the pads is mounted on the outer end of a slide positioned for radial movement with respect to the cylindrical surface of the hollow member. A handle manipulated cam rotatably mounted on the closure of said member is adapted to move the slide outwardly of the cylindrical surface of the member to cause the pads to engage the inner surface of the access pipe to hold the cap in the pipe. The cap also has provisions for carrying a locating coil to facilitate locating a covered access pipe.

BRIEF DESCRIPTION OF THE DRAWINGS

The invention is described in greater detail hereinafter by reference to the accompanying drawing wherein.

BEST MODE FOR CARRYING OUT THE INVENTION

Figure 1:
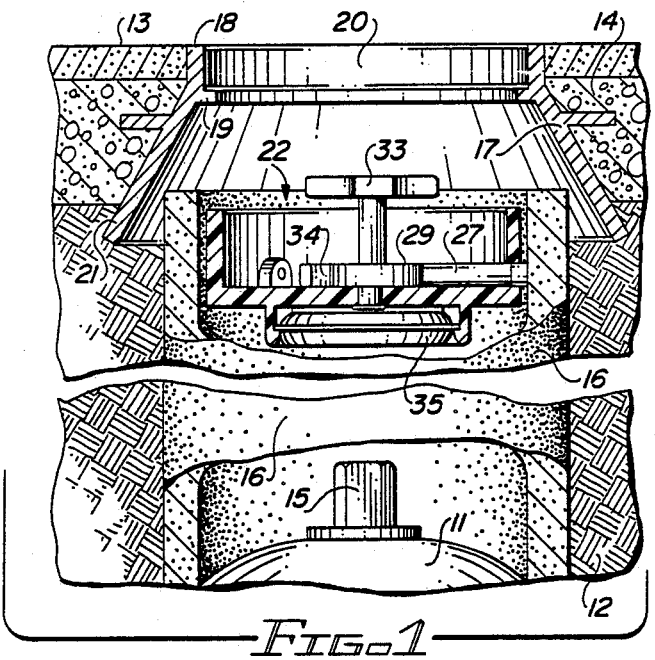
FIG. 1 is a fragmentary and foreshortened illustration of a typical water main shut-off valve installation with the debris cap of this invention in use therein.
Figure 2:
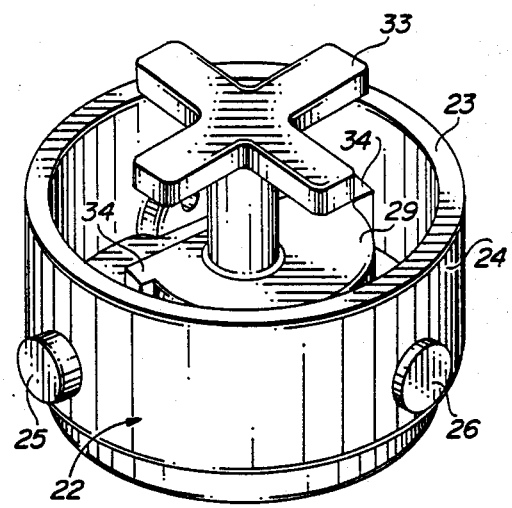
FIG. 2 is a perspective view from above of the cap of this invention.

Referring particularly to FIG. 1, a water main shut-off valve is identified by reference numeral 11. The valve 11 is buried in earth 12 beneath a street 13 the pavement for which is indicated at 14.

Valve 11 may be buried several feet beneath the surface of street 13 and access must be provided to an actuator 15 on the valve through the earth 12. This is usually provided by an access pipe 16 which rests on top of the valve 11 and extends up to within a few inches of the surface of the street 13. It is thus possible for workmen on the street 13 to insert a tool into the opening through access pipe 16 to engage valve actuator 15 to manipulate the valve 11 to shut it or to open it. Access pipe 16 may be formed of concrete or other strong material capable of resisting pressure from the surrounding earth 12.

In most shut-off valve installation the upper end of access pipe 16 terminates within a flanged cover 17 imbedded within the street pavement 14. Cover 17 has its upper circular surface 18 flush with the surface of the street and has a circular lip 19 therebeneath for supporting a circular lid 20. A flared skirt 21 on cover 17 receives the upper end of access pipe 16.

It is not at all unusual for the lid 20 of cover 17 to be displaced by normal vehicle movement or by vandalism. With the lid 20 removed dirt and other debris can enter the opening provided by lip 19 in cover 17. Over time the access pipe 16 can become filled to the extent that a tool can no longer be placed therein to reach valve actuator 15. If it becomes necessary to close valve 11 a crew must perform the arduous and time consuming task of cleaning debris from the access pipe 16. And the time element is certainly important in repairing a broken water main.

To prevent debris accumulating in access pipe 16 it is desirable to cap the pipe opening at or near its upper end.

According to this invention the pipe 16 is closed by a removable debris cap indicated generally by reference numeral 22. Cap 22 comprises a hollow member 23 having a generally cylindrical outer surface 24. Spaced around the periphery of surface 24 are a plurality of resilient, elastic pads. In the embodiment shown in the drawing there such pads are employed although a greater number can be employed if desired. Two of the pads, designated by numeral 25, are stationarily mounted on the hollow cylindrical member 23. The other pad 26 is carried on the outer end of a slide 27 movably carried in a passage 28 in the wall of cylinder member 23. The mounting for slide 26 permits it to reciprocate. along a path disposed radially with respect to the cylindrical surface 24.

Movement of slide 27 and the pad 26 carried thereby is effected by a cam 29 pivotally mounted by means of a pivot pin 30 in an axial opening 31 in a closure plate 32 at one end of cylindrical member 23. Cam 29 has a handle 33 associated therewith by which the cam can be rotated about the axis of pin 30, which axis is preferably coaxial with the axis of cylindrical surface 24.

Figure 3:
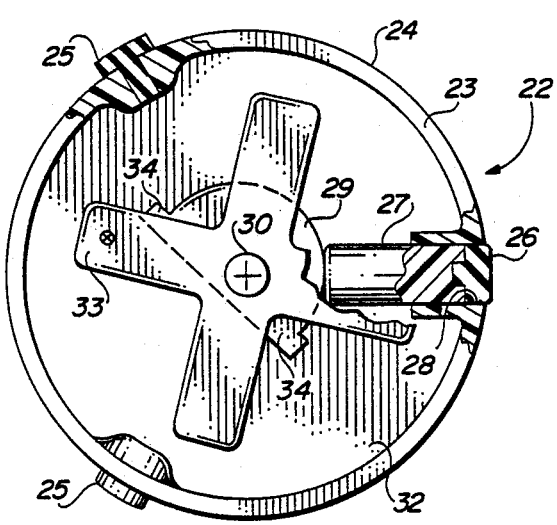
FIGS. 3 and 4 are plan views, partially in section, illustrating operation of the cap.
Figure 4:
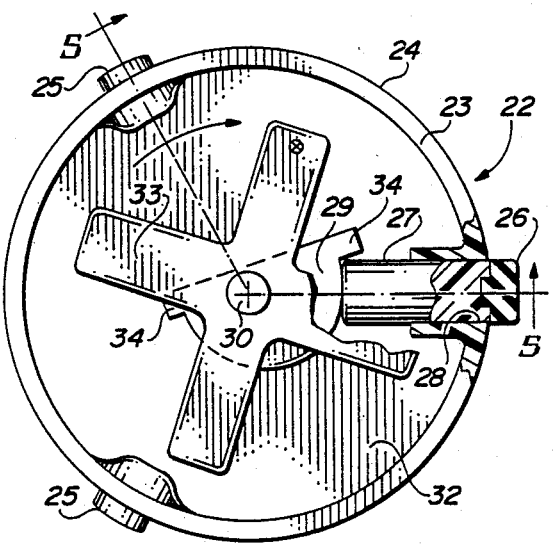

When cap 22 is positioned within the upper end of access pipe as illustrated in FIG. 1, rotation of handle 33 approximately 180° (from the position shown in FIG. 3 to the position shown in FIG. 4) causes cam 29 to move slide 27 outwardly of the hollow cylindrical member 23 of the cap. This effectively increases the contact diameter of pads 25 and 26 causing the pads to frictionally engage the inner surface of pipe 16 to hold cap 22 in place therein.

It will be noted that the rise on cam 29 is gentle or, stated differently, has a low angle of advance, completing full movement of slide 27 over some 180° of cam rotation. With this low angle of advance and normal frictional resistance between cam 29 and slide 27 forces applied to the slide are ineffective to reverse rotate cam 29. Thus, once the handle is turned to lock the cap 22 and pipe 16 the cap remains there until the handle is turned in a reverse direction to loosen slide 27 and its pad 26 from the pipe wall. If desired, cam 29 may have stops 34 formed thereon to limit rotation of the cam.

It is preferred that the hollow cylindrical member 23, the slide 27 and cam 29 with its handle 33 all be formed of molded plastic material, such as foam ABS. Components thus formed inherently exhibit some flexibility and elasticity. This characteristic further increases the frictional engagement between the cam 29 and the slide 27 and further precludes auto rotation of cam 29 when the cap 22 is located in place within pipe 16.

The hollow member 23 portion of cap 22 is preferably made with the diameter for its outer surface 24 which is slightly less than the inside diameter of the pipe 16 in which it is to be installed. Elastic pads 25 and 26 extend outwardly from the surface 24 to contact the pipe 16. However, these pads will not interfere with insertion and removal of the cap 22 through cover 17 even if the latter has a somewhat smaller opening therethrough than the opening in pipe 16. The cap 22 need only be tilted approximately 90° to the horizon for the pads 25 and 26 to clear the cover on insertion and removal of the cap.

Figure 5:
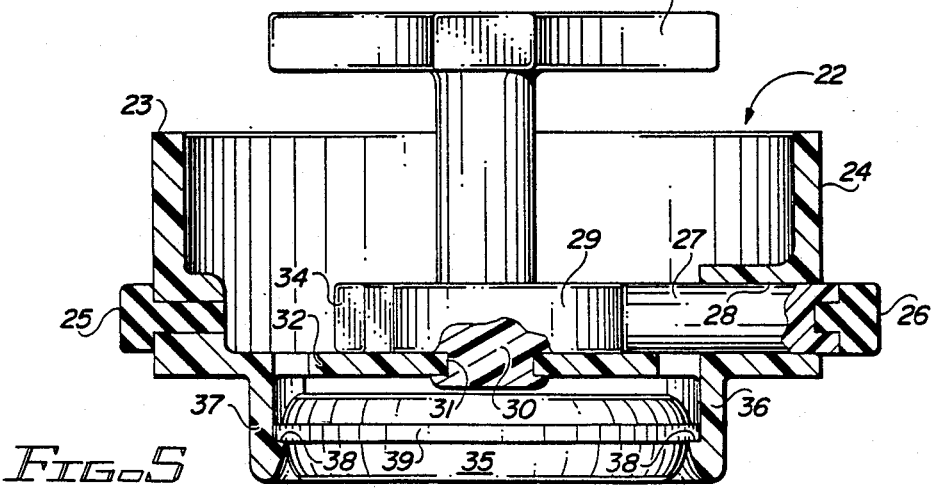
FIG. 5 is an enlarged vertical sectional view through the cap taken as indicated by line 5—5 in FIG. 4.

Debris cap 22 is also preferably configured to hold a locating coil indicated at 35 in FIGS. 1 and 5. During construction and repair operations on a street 13 beneath which a shut-off valve is buried the access pipe for the valve may be covered over. The access pipe 16, being made of concrete is not easily detected with the usual metal detection equipment. The valve 11, itself, is usually buried too deep to be detected. And if, as is preferred, the cap 22 is constructed in its entirety from plastic material, it too defies detection.

Locating coil 35 is a simple device having a coil of metal wire (not shown) encased in a suitable container. Such a device can easily be detected by conventional metal detecting equipment employed by street and water main repair crews.

In order that cap 22 serve not only to prevent debris from entering pipe 16 but facilitate location of the covered pipe the cap has formed thereon a housing 36 for a locating coil 35. Referring particularly to FIG. 5, the housing 36 comprises a pair of integral arcuate skirts 37 depending from closure 32 of the cylindrical member 23. Formed on the inner surface of each skirt 37 is a retaining lip 38 for holding the locating coil 35 within housing 36. The inherent flexibility of housing skirts 37 permits the locating coil to be snapped into place in the housing with a rim 39 thereon resting on lips 38.

What is claimed is:

1. A debris cap comprising a hollow member having a cylindrical outer surface, a closure for one end of the member, a plurality of resilient pads projecting from the outer surface of said member, a slide having inner and outer ends mounted for reciprocal radial movement in said member, said slide carrying a resilient pad at its outer end, a cam mounted on said closure inside said hollow member for rotation with respect to the hollow member, said cam being engageable with the inner end of said slide for moving said slide, said cam having a low angle of advance whereby external forces applied to the slide do not cause rotation of the cam, and a handle for manipulating said cam.

2. The debris cap of claim 1 further characterized in that said closure has housing means thereon for retaining a locating coil on the cap.

3. The debris cap of claim 2 further characterized in that said housing means comprises arcuate skirts on said closure, said skirts having a retaining lip on the interior thereof for retaining said locating coil in said housing.

4. The debris cap of claim 1 further characterized in that said cam is mounted for rotation about an axis which is coaxial with the axis of said cylindrical surface.

* * * * *